United States Patent [19]

Matsui et al.

[11] 3,904,941

[45] Sept. 9, 1975

[54] DRIVE POWER SUPPLY SYSTEM FOR THYRISTORIZED LINEAR MOTOR UTILIZING FEEDER SECTION SWITCHES CONTROLLED BY POSITION DETECTORS FOR CONTROLLING THE ENERGIZATION OF GROUND COILS

[75] Inventors: Kazumi Matsui, Tokyo; Takashi Umemori, Musashino, both of Japan

[73] Assignee: Japanese National Railways, Japan

[22] Filed: May 31, 1973

[21] Appl. No.: 365,550

[30] Foreign Application Priority Data

| May 31, 1972 | Japan | 47-53417 |
| May 31, 1972 | Japan | 47-53418 |
| May 31, 1972 | Japan | 47-53419 |

[52] U.S. Cl. ............ 318/135; 310/12; 104/148 LM
[51] Int. Cl. ........................................ H02k 41/02
[58] Field of Search ......... 310/12, 13, 14; 318/587, 318/687, 135, 124, 127, 132; 104/148 LM, 148 MS

[56] References Cited
UNITED STATES PATENTS

| 3,638,093 | 1/1972 | Ross | 318/687 |
| 3,721,874 | 3/1973 | Pelenc et al. | 310/12 X |
| 3,736,880 | 6/1973 | Ross | 318/135 X |
| 3,771,033 | 11/1973 | Matsui et al. | 318/135 |
| 3,815,511 | 6/1974 | Dukowicz et al. | 104/148 LM |

*Primary Examiner*—Gerald Goldberg
*Attorney, Agent, or Firm*—Armstrong, Nikaido & Wegner

[57] ABSTRACT

A transport means drive power supply control system is provided in which the transport means includes field coils. At least one dc constant current forward-reverse converter is provided and a first plurality of thyristor switch circuits are provided which correspond to the dc constant current forward-reverse converters. A feeder is coupled to the output of the thyristor switch circuits, and a second plurality of ground coils are provided wherein the plurality of thyristor switch circuits is less than the plurality of ground coils. Position detectors are located in proximity to the ground coils for detecting the position of the transport means, and feeder section switches are coupled between the feeder and the ground coils and are controlled by the position detectors for controlling the energization of the ground coils in a predetermined relationship to the position of the transport means. Thus, the magnetic fields of the ground coils interact with the field coils to provide a driving force to the transport means.

9 Claims, 18 Drawing Figures

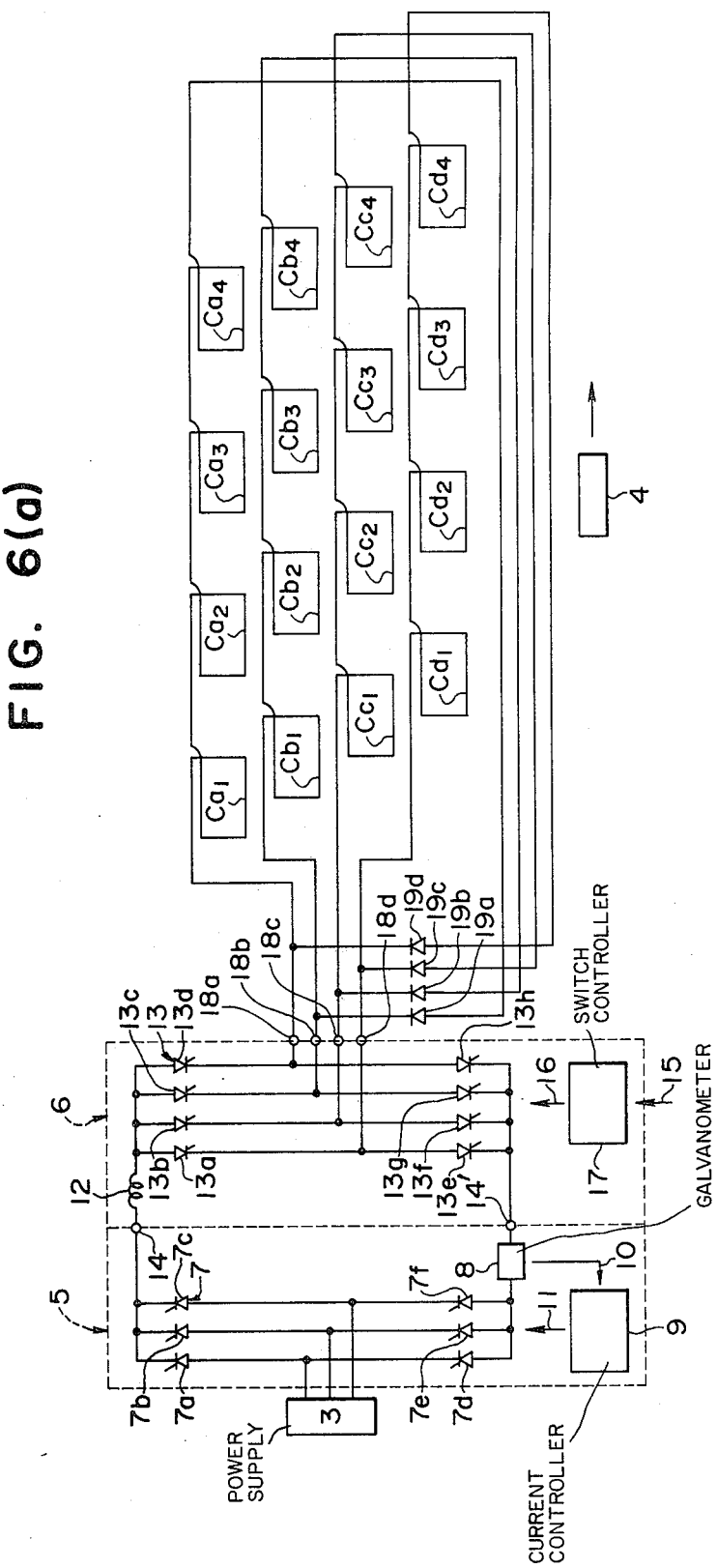

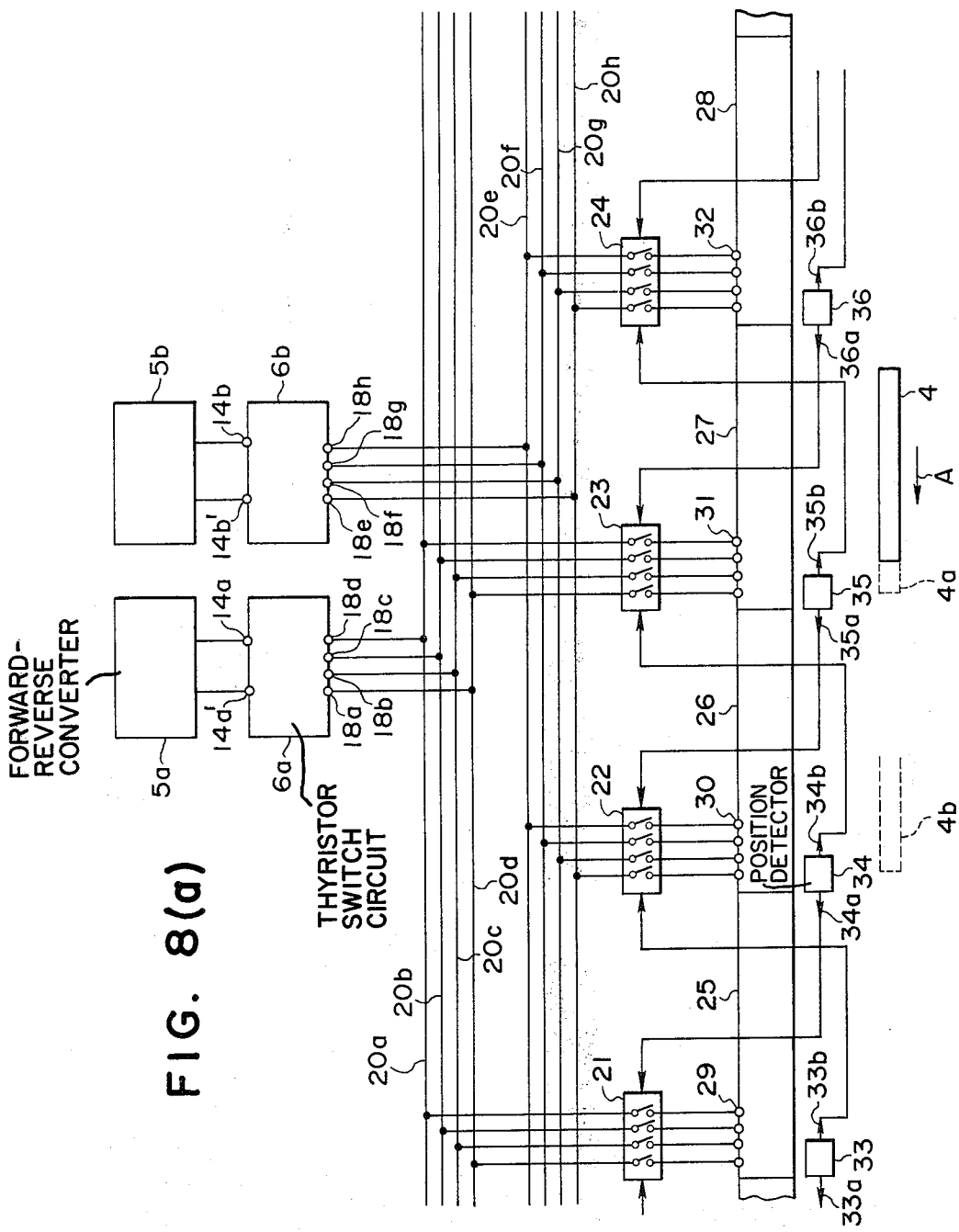

DRIVE POWER SUPPLY SYSTEM FOR THYRISTORIZED LINEAR MOTOR UTILIZING FEEDER SECTION SWITCHES CONTROLLED BY POSITION DETECTORS FOR CONTROLLING THE ENERGIZATION OF GROUND COILS

BACKGROUND OF THE INVENTION

The present invention relates to an improved drive power supply method and apparatus in a transport system using a thyristorized linear motor consisting of ground coils, vehicle fields, dc constant current forward-reverse convertors and thyristor switches.

According to the improved method and apparatus of the present invention, the power loss in the ground coil can be minimized, because the drive power supply can be limited to a definite group of ground coils which are related to the transport means. The switch circuits by said thyristor switches can be made easy through reduction of the inductance in the ground coils connected to said thyristor switch circuits and passage of the transport means over the electric sectioning point in each of the ground coils does not affect the current flowing in the ground coils.

The conventional railway vehicles are designed such that they are supported on wheels which roll along the rails. The torque of a motor is transmitted to said wheels and thereby the drive force to make the vehicles run is obtained through adhesion between the rails and wheels. By this technique of driving the vehicles, however, the operation at over 300 km/h is difficult because of an increased vibration of the truck and a decreased adhesion between rails and wheels.

To avert such a difficulty, a vehicle drive system using an induction linear motor or jet propulsion has been proposed. For practical application of the proposed induction linear motor, however, problems such as lower power factor, poor efficiency and end effect have to be solved. So far no satisfactory solutions have been attained for all the efforts rendered.

On the other hand, the jet propulsion is accompanied by generation of noise in driving the vehicles. This fact alone is enough to eliminate this proposal especially in urban areas.

Moreover, both proposals are controversial with respect to the load bearing. Namely, these proposals involve a number of difficulties which must be overcome such as a heavy wear of wheels, wheel resistance, noise under very high speeds.

Thus a new proposal in the form of a magnetic suspension and air cushion system has been made.

In one proposal the vehicle is to be suspended in the air by the repulsion of a permanent magnet or an electro-magnet; however, this technique cannot give sufficient suspension. Moreover, it requires a tremendous amount of ground equipment. As for the air cushion system, it is very noisy and is not appropriate for application to a multi-unit train.

In the operational control of the transport means, the conventional practice is for a driver to ride the transport means and the operation is controlled by him. He makes an appropriate judgement on the information provided by the instruments and signals. In an automated operation system of the transport means now being developed, the underlying principle is substitution of the driver's judgement and action with a computer or the like. For this purpose, the transport means must be cooperated with a computer and an intricate means of information communication has to be provided between the transport means and the control center on the ground.

To realize a transport system based on such an idea, an enormous expenditure will be involved.

As the best drive system of transport means for speed-up and automatic control of operation required of such a new transport means, a thyristorized linear motor system is conceivable.

SUMMARY OF THE INVENTION

In view of this situation, the object of the present invention is to improve the drive power supply system, particularly for transport system using a thyristorized linear motor system which is composed of ground coil, vehicle fields, dc constant current converters and thyristor switch circuits. Through the improvement in accordance with the present invention, it is possible to make an independent supply of power from said dc constant current-reverse converters to only those of the ground coils which are related to the transport means, so that the power loss in the ground coils can be minimized. Meanwhile the inductance in the ground coils connected to said thyristor switch circuits can be reduced, thereby facilitating the switching by said thyristor switches. Further, passage of the transport means over the electric sectioning point in each ground coil can be prevented from affecting the current flowing in the ground coils.

In the transport system using a thyristorized linear motor composed of ground coils, vehicle fields, dc constant current forward-reverse converters and thyristor switch circuits, the present invention lies in the composition of:

— at least one dc constant current forward-reverse converter,

— a plurality of thyristor switch circuits corresponding to said dc constant current forward-reverse converters, — a number of feeder groups branching off the output terminals of said thyristor switch circuits, — a number of ground coils which are geometrically integral and continuous by electrically split into sections, and — feeder sections, corresponding to said ground coil, connected to feeders in said feeder groups. By detecting the position of the transport means, the drive power is supplied to only those of the ground coils which are related to the transport means via said dc constant current forward-reverse converters, said thyristor switch circuits and said feeders. Advantageously, the output circuits of said thyristor switch circuits are connected to said ground coils and, between the input circuits of said thyristor switch circuits and said plurality of feeders, different feeder groups are successively connected to feeder section switches, thereby supplying the drive power to only those ground coils which are positionally related to the transport means. More preferebly, positive and negative feeder section switches are respectively inserted between the positive input terminals of said thyristor switch circuits and the positive feeders and between the negative input terminals thereof and negative feeders. A position detector detects the position of the transport means and thereby throws said feeder section switches on or off. The drive power supply is made such that the plurality of ground coils which are related to the transport means are electrically series-connected to said dc constant current forward-reverse converters via the positive and negative feeders, the positive and negative feeder section switches and the thyristor switches.

BRIEF DESCRIPTION OF THE DRAWINGS

These and other objects, features and advantages of the present invention will become more readily apparent from the following detailed description made in conjunction with the attached drawings.

FIG. 4 (b) is a plane view of FIG. 4 (a).

FIG. 6 (b) is a circuit diagram illustrating details of constant current control system in the dc constant current forward-reverse converters in FIG. 6 (a).

FIG. 6 (c) is a circuit diagram illustrating details of thyristor switch circuit control system in the thyristor switch circuits 6 (a).

FIG. 8 (a) is a circuit diagram illustrating an embodiment of the present invention.

DESCRIPTIONS OF THE PREFERRED EMBODIMENTS

Figure 1:
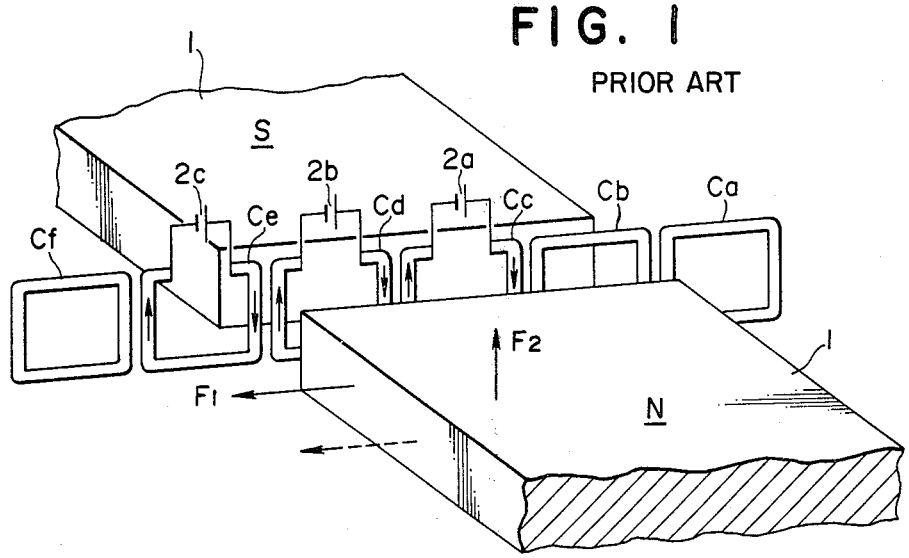
FIG. 1 is an oblique view illustrating the basic functional relationship between the vehicle field and the ground coil in the transport system to which the present invention is applicable.
Figure 2:
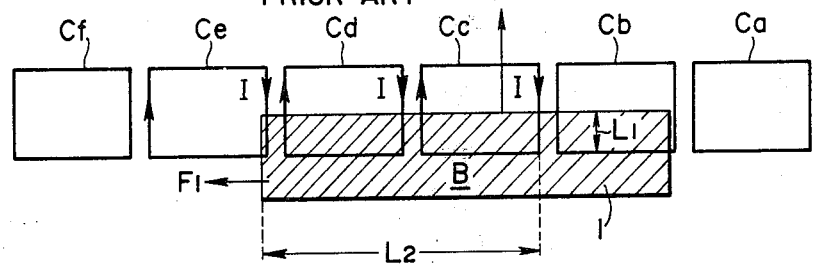
FIG. 2 is a side view illustrating the generation of drive and lift in FIG. 1.
Figure 3:
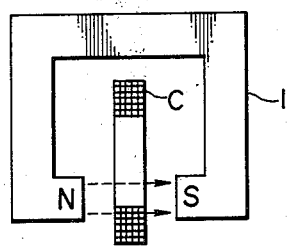
FIG. 3 is a front elevation view showing variation of the basic composition illustrated in FIG. 1.

FIGS. 1 – 3 show the fundamental constitution illustrating the functional relationship between the vehicle field and the ground coil in the transport system to which the present invention is applicable.

In FIG. 1 $ca - cf$ are rectangular current loops stationarily installed on a straight line at definite intervals vertically to the ground. The current loops $Cc - Ce$ receive the current respectively from the dc source $2a - 2c$.

The vehicle field 1 consists of an electromagnet or a permanent magnet, with respective end faces opposed to each other at a specified distance; and the ground coils $Cc - Ce$ are fixed parallel between these opposed end faces. The vehicle field 1 generates a magnetic flux perpendicular to the ground coils $Cc - Ce$. Thus the magnetic flux of the vehicle field 1 cuts across the vertical and horizontal conductors of the ground coils.

Under this arrangement, if the current flows in the arrow direction through, say, the coils $Cc - Ce$, the magnetic flux of the vehicle field cut across the vertical conductors of the ground coils $Ce - Ce$ and in consequence the drive force $F_1$ is generated by Flemings' Law of Left Hand. Meanwhile, as the magnetic flux of the vehicle field 1 cuts across the horizontal conductors of the ground coils $Cc - Ce$, in the same way Flemings' Law of Left Hand works generating a suspension force $F_2$ in the vertical direction to the ground.

Thus, if the ground coils $Ca - Cf$ are fixed, the vehicle field 1 will be suspended and driven in the dotted arrow direction. Therefore, by setting the direction of the current flowing in the ground coils and the direction of the magnetic flux from the vehicle field 1 such as illustrated, the vehicle field 1 can be suspended and driven in a desired direction.

FIG. 2 is FIG. 1 viewed from a direction perpendicular to the end faces of the vehicle field 1, showing the relationship between the vehicle field 1 and the vehicle coils.

In FIG. 2 I is the magnitude of the current flowing in the ground coils $Cc - ce$ and B represents the extent and intensity of the vehicle field 1.

Putting $l_2$ as the length of the horizontal conductors of the ground coils $Cc - Ce$ in which the current crosses the field B (1) and $l_1$ as the length of the vertical conductors of the ground coils $Cc - Ce$ in which the current crosses the field B, the following drive force $F_1$ is developed between the current element I and the field B;

$$F_1 = B \times l_1 \times I \ldots (1).$$

If the ground coils are fixed, a drive force will act such as to cause the field B to move in the horizontal direction. Meanwhile, the following suspension force $F_2$ develop between the field B and the horizontal current component of the ground coils;

$$F_2 = B \times l_2 \times I$$

If the ground coils $Ca - Cf$ are fixed a suspenpension force $F_2$ acts to hold the field 1 in suspension. One pitch displacement of the vehicle field B will cause the field B to cut across the ground coil $Cf$, i.e., the other portion of the vertical conductor and in consequence the drive force will be cancelled. But, if at this instant the ground coil $Cc$ is cut off from the current and the current is made to flow in the ground coil $Cf$, the vehicle field will continue to be suspended and driven. Therefore, when the transport means is equipped with the field 1 and said ground coils are provided with mechanisms which successively switch on with the progress of the transport means, it becomes possible to suspend and drive the transport means continuously.

FIG. 3 is FIG. 1 as viewed from the moving direction of the transport means or the field 1, N. S. being the magnetic poles of the field 1.

The suspension and propulsion system as described referring to FIGS. 1 and 3, is free from the drawbacks of the conventional linear-motorized system, because it provides an efficiency of suspended propulsion for use with a conventional power supply. Meanwhile it is free from the noise in propulsion such as generated by the proposed jet-propulsion system. Moreover, it needs no separate installations for suspension and propulsion such as required for the proposed magnetic suspension or aircushion system.

The present invention presupposes use of the drive system based on the above-mentioned principle.

Figure 4A:
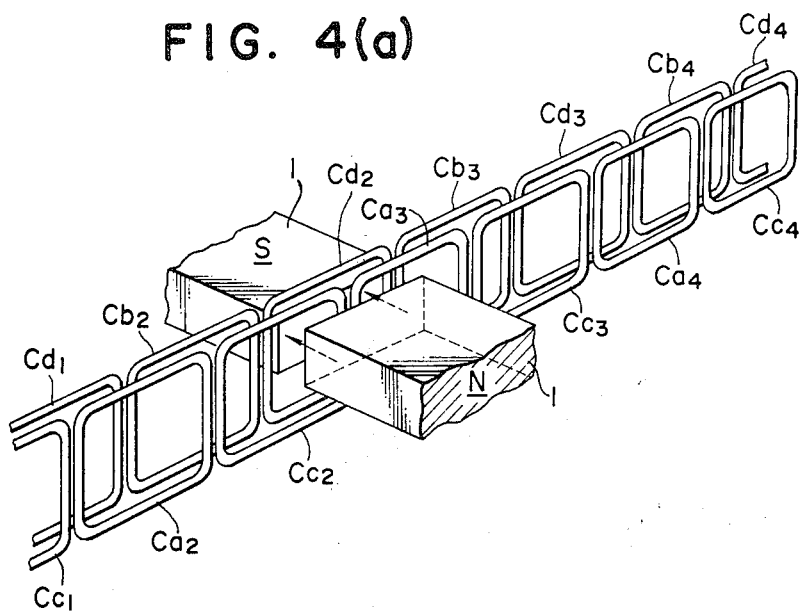
FIG. 4 (a) is an oblique view illustrating a structural relationship between the vehicle field and the ground coil according to the transport system to which the present invention is applicable.
Figure 4B:
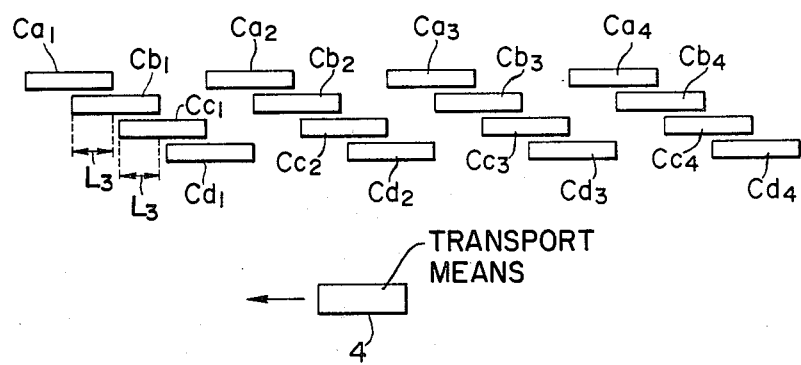

FIG. 4 ($a$) and ($b$) illustrates an example of the vehicle field and the ground coil in the transport system to which present invention is applicable.

In FIG. 4 ($a$) and ($b$), the ground coils $Ca_1 - Cd_4$ are the same as the ground coil $Ca - Cf$ shown in FIGS. 1–3. The ground coils $Ca_1 - Ca_4$ are linearly arranged in the moving direction of the transport means 4 at definite distance from one another.

It is the same with $Cb_1 - Cb_4$, $Cc_1 - Cc_4$ and $Cd_1 - Cd_4$. Meanwhile $Ca_1 - Ca_4$, $Cb_1 - Cb_4$, $Cc_1 - Cc_4$ and $Cd_1 - Cd_4$ are arranged in parallel at definite distance from one another. Thereby, all ground coils are arranged such that in the moving direction of the transport means all ends may successively overlap one another by the length $L_3$. Namely, overlapping of the length takes place between the right end of $Ca_1$ and the left end of $Cb_1$, between the right end of $Cb_1$ and left end of $Cc_1$, between the right end of $Cc_1$ and the left end of $Cd_1$, between the left end of $Ca_2$ and the right end of $Cd_1$ and so on.

The ground coils $Ca_1 - Cd_4$ thus are successively arranged along the moving path of the transport means to suspend and drive the vehicle field along both sides of said ground coil group and by the principal described with reference to FIGS. 1 – 3, the transport means mounted on said vehicle field 1 is suspended and driven.

Figure 5:
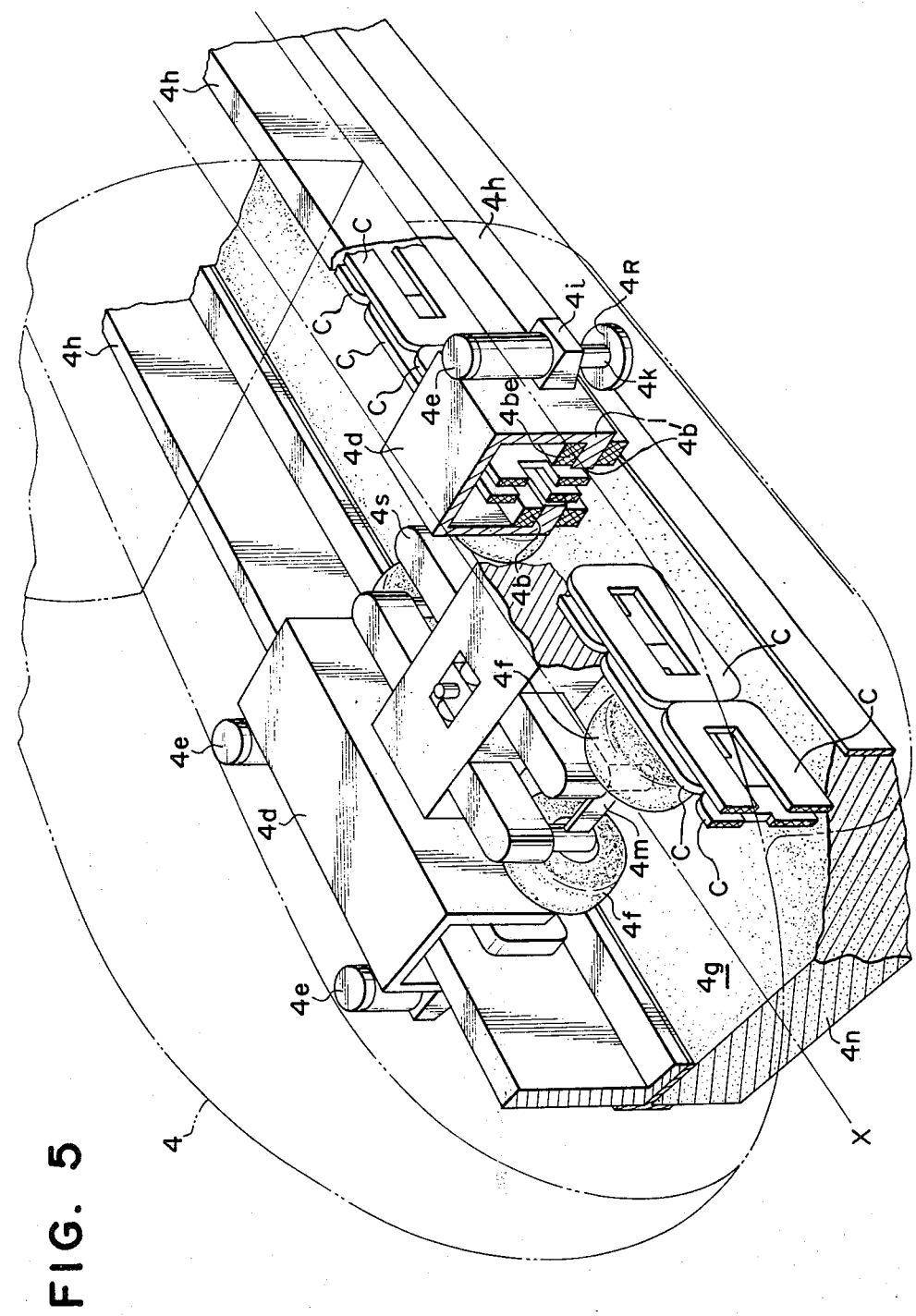
FIG. 5 is an oblique view illustrating a structural relationship between the transport means equipped with the vehicle field and the ground coil.

FIG. 5 illustrates a structural relationship between the transport means 4 equipped with the vehicle field 1 and the ground coil.

In FIG. 5, is the same as the ground coils in FIG. 4 ($b$) and these ground coils are arranged in parallel on both sides of the moving path 4$g$ of the transport means 4. Thereby the ground coils arranged in parallel on both sides are located in symmetry with respect to the longitudinal axis $x$ of the moving path.

Vehicle coil 1 of ⊓-form in section with ends 4$b$, 4$b'$ opposed to both side surfaces of said ground coils are arranged in parallel; said ends 4$b$ and 4$b'$ being joined together by connector 4$d$. From a specified site on the outside of the said vehicle coil 1 the air spring support 4$i$ juts outward and thereon is attached an air spring 4$e$ of prior art. On the underside of said support 4$i$ is attached a shaft 4$k$, to which is pivoted a guide roller 4R. Said guide roller 4R is movable, with the progress of the transport means, in contact with a guide plate 4$h$ laid out along the moving path covering the ground coils. Between the vehicle coils is the shaft 4$m$, which is equipped at definite intervals with rotatable tires 4$f$ for landing and take off. The field coil 4$be$ is a coil for energizing the field 1.

In this arrangement the ground coils are fixed to the ballast 4$n$ and transport means 4 is mounted on the air spring 4$e$ in accordance with a method in the prior art.

The ground coils on both sides of the moving path are arranged as illustrated in FIG. 4 ($b$). By passing the current at predetermined time intervals successively from $Ca_1$ to $Cb_1$, from $Cb_1$ to $Cc_1$, from $Cc_1$ to $Cd_1$, from $Cd_1$ to $Ca_2$, the suspension and drive take place cyclically in the longitudinal direction of ground coils. Since the adjoining ground coils are arranged to overlap each in length, the suspension and drive can be made strong or weak depending on the interval of current passage through said ground coils. Moreover the suspension and drive can be stronger and more stable than under the arrangement illustrated in FIG. 1.

Figure 6B:
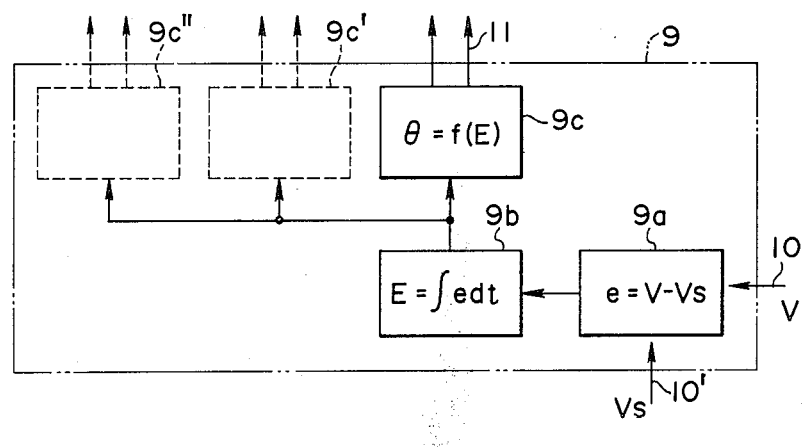
FIG. 6 (a) is a circuit diagram illustrating a drive power supply system for the ground coils to suspend and drive the vehicle in FIG. 4 (a) and (b).
Figure 6C:
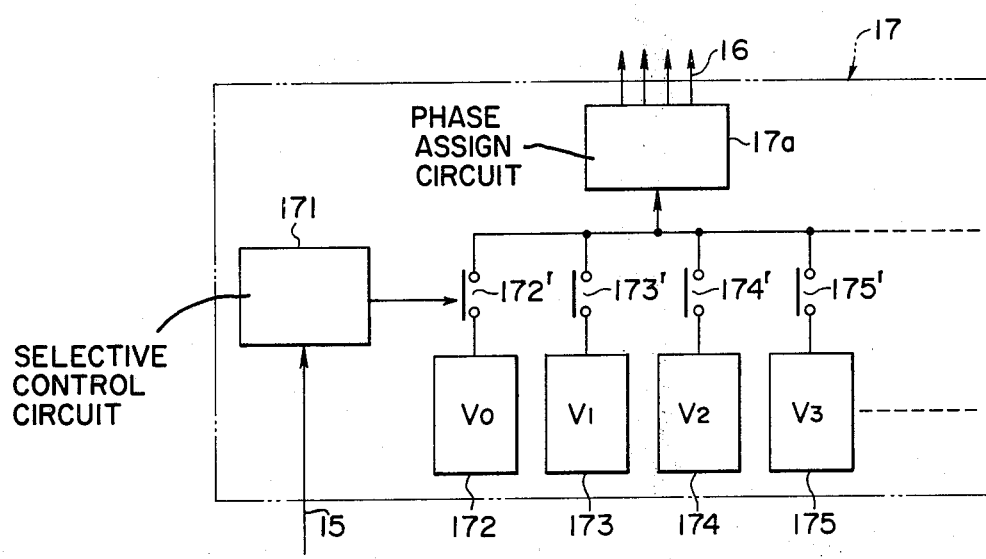

As a drive power supply system for said ground coils thus arranged to suspend and drive the vehicle field, the method as illustrated in FIG. 6 ($a$) is conceivable.

In FIG. 6 ($a$) the ground coils $Ca_4 - cd_4$ are of the same constitution as ones illustrated in FIG. 4 ($a$) and ($b$) and they are also connected to the dc constant current forwarding-reverse converters 5 via the thyristor switch circuits 6. In the thyristor switch circuit 6, the thyristor switches 13$a$ – 13$h$ are connected in a multi-phase bridge and this multi-phase bridge connection has its one end on the dc side connected via the commutation reactor 12 to the input terminal 14 and the other end connected to the input terminal 14'. The ac side is connected to the output terminal 18$a$ – 18$d$ which are connected to a ring connection point of the ground coil.

In the dc constant current forward-reverse converter 5, the thyristors 7 are connected in a multi-phase bridge and one end of said bridge connection is connected via the galvanometer 8 to the terminal 14' and the other end of it is connected to the terminal 14. Then the ac power supply 3 is connected to each of these bridge connections.

FIG. 6 ($b$) shows a detailed mechanism of the constant current control system as expressed in terms of the constant current controller 9, the constant current gate signal 11 and the current signal 10, in the dc constant current forward-reverse converter 5. The constant current control system consists of a combination of the working circuit 9$a$, the integrating circuit 9$b$ and the pulse phase control circuit 9$c$ which sets the power supply phases. The working circuit 9$a$ produces an output $e = V - Vs$, i, e, the difference between V that is the current signal 10 proportional to the output current flowing through the galvanometer 8 and Vs, that is the reference voltage signal 10' corresponding to the present output current. The integrating circuit 9$b$ receives the above output e and produces its time integration $E = \int e dt$. Further, said pulse phase controller 9$c$ is intended for changing the phase angle of the constant current gate signal 11 which is applied to the thyristor 7 at phase angles $\theta$ and $\theta + \pi$, in accordance with said output voltage E.

Under this arrangement, the output current of the dc constant current forward-reverse converter 5 can be maintained at a present constant value over the whole range of forward-reverse conversions, regardless of the polarity or magnitude of the speed electromotive force of the ground coils.

FIG. 6$c$ shows a detailed mechanism of the thyristor switch control system as expressed in terms of the thyristor switch controller 17, the switch gate signal 16 and the control signal 15, in the thyristor switch circuit 6. Said thyristor control system consists of a selective control circuit 171, reference frequency pulse generating circuit 172 – 175, contacts 172' ~ 175' of the selective relays of the selective control circuit 171 and a phase assign circuit 17$a$. Said reference pulse generating circuit 172 – 175 are intended for generating control pulses at frequencies corresponding respectively to the vehicle speed levels $V_0$, $V_1$, $V_2$, $V_3$ . . . ($V_0 < V_1 < V_2 < V_3$ . . . ). Meanwhile, said selective relays are intended for selecting one out of the outputs from said reference frequency pulse generating circuits 172 – 175. Further, said selective control circuit 171 is intended for turning on, selectively upon the speed instruction 15 from the control center, one of said contacts 172' – 175'.

Figure 7:
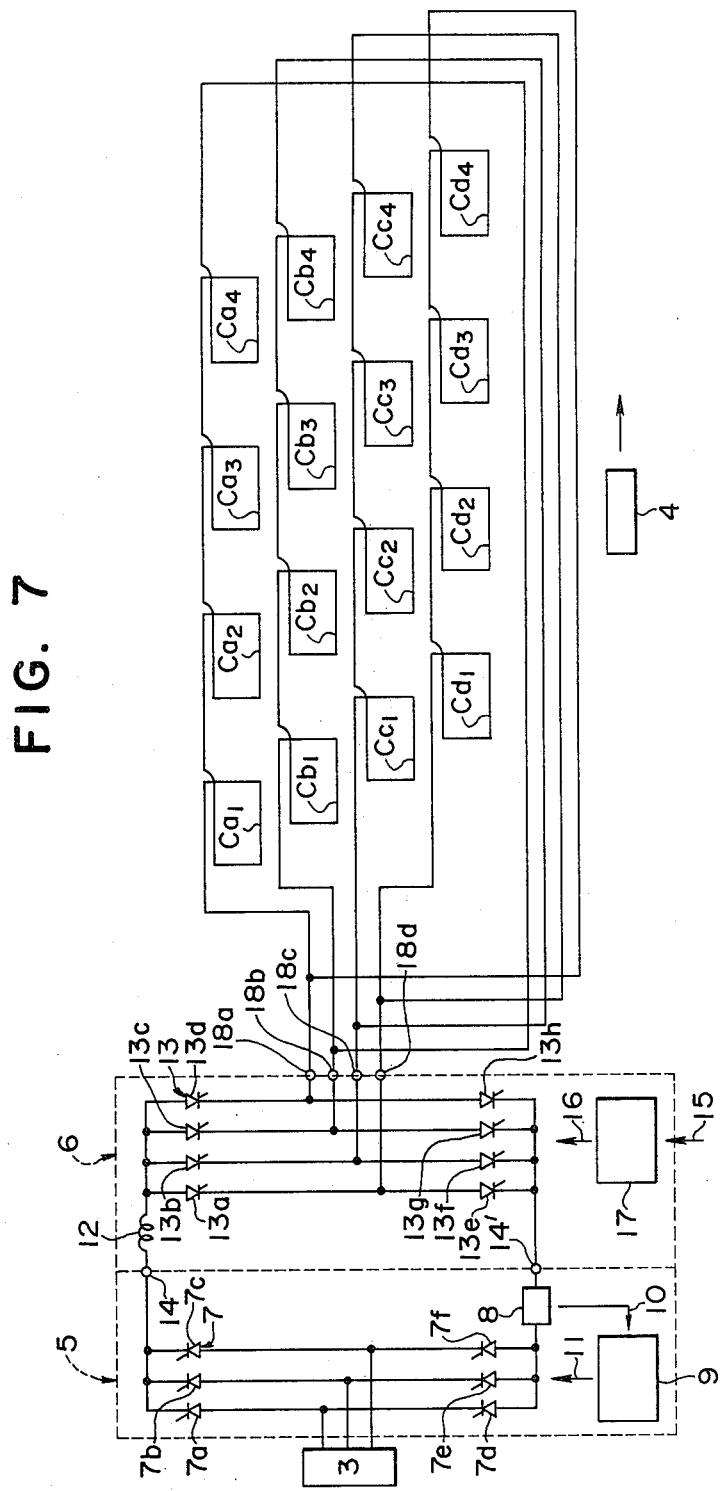
FIG. 7 is a circuit diagram illustrating another drive power supply system of FIG. 6 (a).

Further, said phase assign circuit 17a is intended for receiving one of the outputs from said reference frequency pulse generating circuit 172 – 175 through one of the turned on contacts 172' – 175' and generating a switch gate signal 16 with an assigned phase. Thus, the thyristor switch 17 can switch the ground coil current at a frequency matching the speed level instructed from the control center. To be more specific, in FIG. 6(a), at first 13d and 13f conducts; in a certain time lapse thereafter 13d and 13f are cut off and 13c and 13e are made conducting and in a certain time thereafter, 13c and 13e are cut off and 13b and 13h are made conducting. In this way first the current flows through the Ca group and the cb group of ground coils; after awhile, the current flows through the Cb and Cc group and then through the Cc and Cd group. The vehicle field displaces itself receiving a suspension force from the current flowing in the lower, horizontal portion of the ground coil and the propulsion force by one-half pitch length of the ground coil for every switching mentioned above. Depending on whether the velocity of the above switching of the thyristor is stepped up or held constant or stepped down, correspondingly, the rate of displacement of vehicle field is accelerated, stays constant or decelerates. Meanwhile, the product of the number of current switching and half pitch of the coil length correspond to the length of the field displacement. The propulsion mechanism in FIG. 7 is the same as the one in FIG. 6 except that it is so arranged that no suspension force develops in the transport means. Namely, in FIG. 7, with no presence of the diodes 19a–19d which are found as introduced in its coil group circuit of FIG. 6(a) the current flowing in the ground coil is designed reversible. Under the arrangement of FIG. 7, the switching takes place such that the current in its coil is reversely switched and, with the suspension force mutually cancelling, the transport means receives only the drive force. In this case, it goes without saying that the transport means must be equipped with wheels and the moving path for it must be laid with rails on which said wheels are to roll.

In the examples shown in FIGS. 4 – 7, the ground coil is represented as a four layers composition, but if necessary the composition may be designed multi-layer with more than four layers, thereby reducing the inductance of the ground coil, facilitating the current switching and improving the high-speed performance.

The drive system for transport means, as illustrated in FIGS. 4–7, is preferable for a new transport system which is required to be able to give high speed and permit automated operation, however, the following problems have to be solved before the present system can come into being.

For one thing, — this applies commonly to any linear motor drive system with the primary on the ground — supply of drive power over the entire length of the ground coil is inefficient from a practical standpoint because of heavy resistance loss involved. For another, the current switching by said thyristor switch circuit 6 is difficult on account of the inductance being large in the ground coil.

The present invention is intended for solution of these problems inherent in the drive system illustrated in FIG. 4 – 7.

Now the present invention is to be described referring to FIG. 8(a) – 13.

The drive power supply control system of this invention consists of ground coils, a power supply system and a control system.

A ground coil is composed of electrically sectioned coil elements 25 – 28. All coil elements are the same as those illustrated in FIG. 6(a) and FIG. 7; being geometrically integral in a straight line, these elements are fixed along the moving path of the transport means. The length of each of the ground coils 25 – 28 is adequately selected depending on the number of vehicle fields, the moving speed of the transport means, etc. Each ground coil is provided with terminal 29 – 32 corresponding to the output terminals in FIG. 6(a) and FIG. 7.

The power supply system comprises; dc constant current forward-reverse converters 5a and 5b, thyristor switch circuits 6a and 6b; feeders 20a ~ 20d, 20e ~ 20h; and feeder section switches 21 – 24.

The above-mentioned power supply system is broadly divided into two parts; the part a which leads to the ground coil elements 25 and 27 via the dc forward-reverse converter 5a, the thyristor circuit switch 6a, the feeders 20a – 20d and the feeder section switches 21 and 23; and the part b which leads to the ground coil element 26 and 28 via the dc forward-reverse converter 5b, the thyristor switch circuit 6b, the feeders 20e – 20f and the feeder section switches 22 and 24.

Among them, the dc constant current forward-reverse converters 5a and 5b, the thyristor switch circuit 6a and 6b and the electrical connections between them are respectively the same as the constant current forward-reverse converter 5, the thyristor switch circuit 6 and the electrical connection between them in FIGS. 6 and 7. In FIGS. 6 and 7, the output terminals 18a – 18d of the thyristor switch circuit 6a are connected directly to the ground coils, but in FIG. 8 they are connected respectively to the corresponding points of the feeders 20a – 20d in the part a. Similarly, the output terminal 18e – 18h of the thyristor switch circuit 6b are connected respectively to the corresponding points of the feeders 20e – 20h on the part b. The feeders 20a – 20d of the part a and feeders 20e – 20h of the part b, four each totaling eight feeders, are arranged along the continuously laid ground coils 25 – 28. The feeders 20a – 20d of the part a are linked to the corresponding points of the ground coil terminals 29, - 31 via the feeder section switches 21 and 23. Similarly, the feeders 20e – 20f of the part b are linked respectively to the corresponding points of the ground coil terminal 30, 32 via the feeder section switches 22 and 24.

Figure 8B:
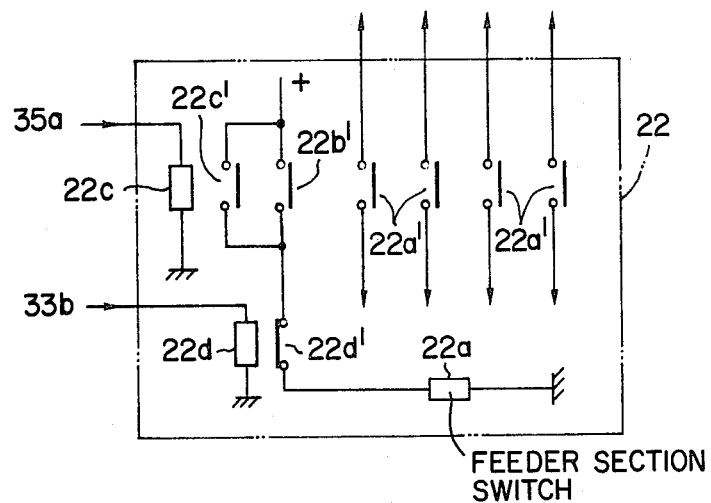
FIG. 8(b) is a circuit diagram of the feeder section switch illustrated in FIG. 8(a).

The control system is composed of the position detectors 33 – 36 arranged corresponding to said ground coil element 25 – 28. These position detectors are located adjoining the left extreme of the corresponding ground coil elements in FIG. 8. The position detection of arrow A by media such as light, sound wave or radio wave, respectively give signals 33a – 36a, thereby turning on the feeder section switch corresponding to the ground coil element ahead. For instance, the on instruction from the detector 34 turns on the feeder section switch 21, the detector 35 turns on the switch 22, the detector 36 turns the switch 23. Meanwhile, the off signals 33b – 36b turn off the feeder section switches 21 – 24 corresponding to the ground coil element just behind. For instance, the off signal 33b turns off the switch 22, the instruction 34b turns off 23, and 35b turns off 24. In this case, the specific technique of position detection using the position detectors 33–36 is, for instance, a system with the light source carried on the vehicle and, say, a phototransistor installed as a position detector on the ground, thereby said transistor reacts to the train passage and produces a signal. Details of the feeder-section switches 21–24 employed in this embodiment are shown in FIG. 8(b). In FIG. 8(b), 22 is a feeder-section switch. The feeder-section switches 21–24 in FIG. 8(a) are the same as 22 in the above. 22a is the exciting coil of the feeder-section switches; 22a' is the main contact of 22a; 22b' is an auxiliary contact operating simultaneously with the main contact 22a', 22c, 22d are auxiliary relays and 22c', 22d' are respectively the a-contacts of the auxiliary relay 22c (a contact which is closed through excitation of the auxiliary relay 22c) and the b-contact of the auxiliary relay 22d (a contact which is open through excitation of the auxiliary relay 22d). 35a, 33b are respectively on and off signals. The on-signal 35a causes the auxiliary relay 22c to operate, thereby closing the contact 22c' and holding the exciting coil 22a of the feeder section switch 22 in the on state. The off-instruction 33b causes the auxiliary relay 22d to operate, thereby releasing the exciting coil 22a from the on state and switching off the feeder section switch 22.

Figure 8C:
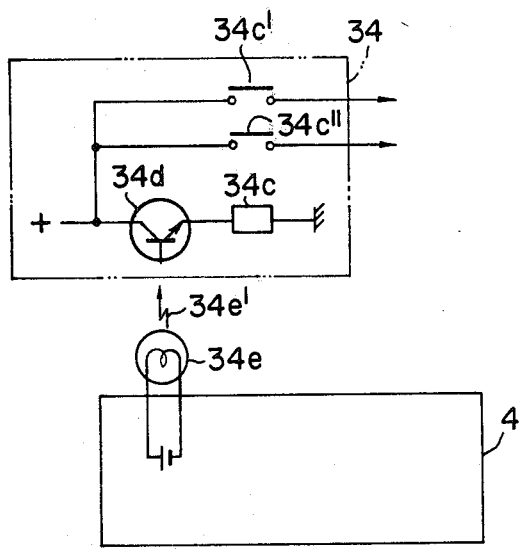
FIG. 8(c) is a circuit diagram of the position detector illustrated in FIG. 8(a).

FIG. 8(c) illustrates the details of the position detectors 33–36 in FIG. 8(a). In FIG. 8(c), 34 is a position detector. The position detectors 33–36 in FIG. 8(a) are the same as 34. 34c is an auxiliary relay and 34c', 34c" are the contacts of the auxiliary relay 34c. 34d is photo transistor and 34e is the light source mounted on the vehicle 4, 34e' being a beam emitted from 34e.

When the vehicle 4 passes the position detector 34, the beam 34e' from the light source 34e on the vehicle is incident upon the photo-transistor 34d and in consequence the current flows in the auxiliary relay 34c, thereby closing the contact 34c', 34c" and causing 34c' to issue an on signal and 34c" to issue an off-signal.

In this arrangement, suppose the transport means 4, moving from rightward, reaches the spot indicated in FIG. 8(a). In this state, the feeder section switches 23 and 24 are turned on by the on signal from the position detector 36 and its adjacent detector and in consequence the drive power is supplied to the ground coil element 27 from the dc constant current forward-reverse converter 5a via the feeders 20a – 20d, and the feeder section switch 23, while the drive power, independently of the part a, is supplied to the ground coil element 28 from the dc constant current forward-reverse converter 5b and the thyristor switch 6b via the feeder 20e – 20f and the feeder section switch 24. The thyristor switching action in the thyristor switch circuits 6a and 6b takes place simultaneously upon the speed instruction as shown in FIGS. 6 and 7, thereby supplying the drive power to the ground coils via the feeders and the feeder section switches; otherwise the action is the same as in FIGS. 6 and 7.

As the transport means 4 moves up to the position 4a, the position detector 35 issues an on signal 35a, upon which the feeder section switch 22 corresponding to the ground coil element 26 just ahead goes on; at the same time the off signal 35b turns off the feeder section switch 24 corresponding to the ground coil element 28 just behind. As the result the drive power supply circuit of the dc constant current forward-reverse converter 5b — the thyristor switch circuit 6b — the feeder 20e – 20h — the feeder section switch 24 — the ground coil element 28 is cut off; and the drive power is supplied to the ground coil element 26 via the feeder section switch 22.

When the transport means 4 moves further and reaches the position 4b in FIG. 8(a), similarly to the above upon the on signal from the position detector 34 the feeder section switch 21 is turned on to supply the drive power to the ground coil element 25, which at the same time upon the off signal 34b the feeder section switch 23 is turned off to cut off power supply to the ground coil element 27 and ultimately the drive power is supplied to the ground coil elements 25, 26. In this manner, with progress of the transport means 4, the ground coil elements for two sections receive the power respectively from independent drive power systems.

In the system illustrated in FIG. 8(a), it is only those of the ground coil elements which are related to the transport means 4 that receive the drive power and have the current changed by the thyristor switch circuits 6a and 6b. The inductance in the ground coil is small enough to easily make the current change by the thyristor switch circuits and the resistance in the ground coils is small enough to make the power loss due to resistance loss low enough.

Moreover, as stated above, the ground coil elements in the part a and b receive separately from the dc constant current forward-reverse converters 5a and 5b a drive power which is controlled so that the magnitude of the current may be constant; therefore two ground coil elements, say, 26 and 27 can act as if they were an integral ground coil, without being influenced from the magnitude of the counter electromotive force which depends on whether the speed of the transport means is fast or slow or whether the transport means 4 is in transition between the ground coils, say, 26 and 27 or not.

Figure 9:
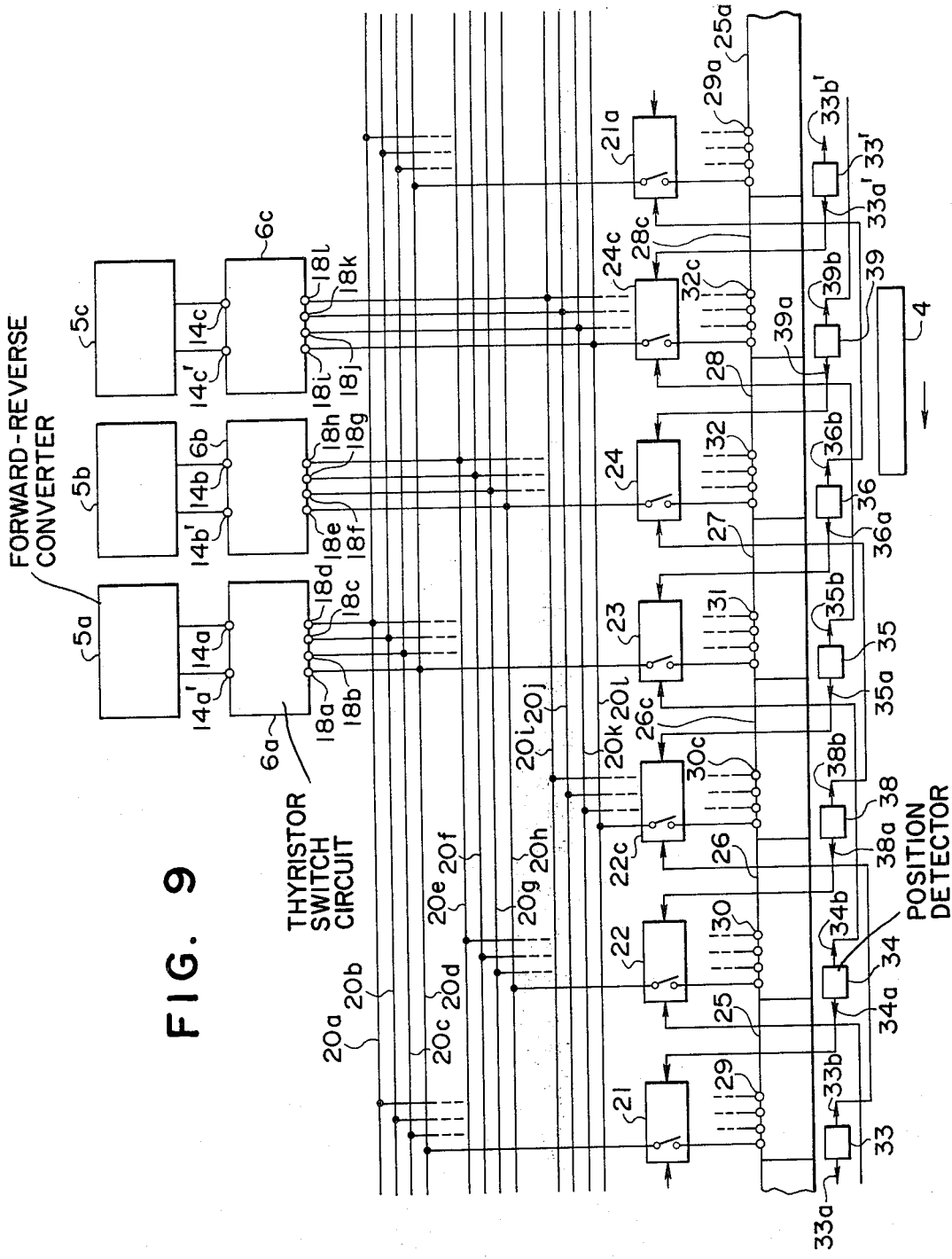
FIG. 9 is a circuit diagram illustrating another embodiment of FIG. 8.

FIG. 9 illustrates an example of a drive power supply control system for a thyristor linear motor similarly composed of three sets of dc constant current forward-reverse converters.

In FIG. 9, 5a, 5b, and 5c are dc constant current forward-reverse converters; 14a ~ 14c' are input terminals; 6a ~ 6c are thyristor switches; 18a – 18l are output terminals; 20a – 20d, 20e – 20h and 20i – 20l are feeders; 21, 22, 22c 23, 24, 24c, 21a are feeder section switches and 25 ~ 28, 28c 25a 26c are ground coil elements; 29–32, 30c, 32c and 29a are ground coil terminals; 33–36, 38 39 and 33' are position detectors; 33a~36a, 38a, 39a and 33a' are on signals; 33b~36b, 38b, 39b, 33b' are off signals; and 4 is the transport means.

The circuit is shown in FIG. 9, as compared with the one in FIG. 8(a) is characterized by the drive power supply system from the dc constant current forward-reverse converters to the ground coil elements which include the following three parts; (a) part which leads via the dc constant current forward- reverse converter 5a, the thyristor switch circuit 6a, and the feeders 20a – 20d to the feeder section switch 21, the ground coil element 25 or to the feeder section switch 23, the ground coil element 27 or to the feeder section switch 21a, the ground coil element 25a; (b) part which leads via the dc constant current forward-reverse converter 5b, the thyristor switch circuit 6b, the feeders 20e – 20h to the feeder section switch 22, the ground coil element 26 or to the feeder section switch 24, the ground coil element 28; and (c) part which leads via the dc constant current forward-reverse converter 5c, the thyristor switch circuit 6c and the feeders 20i – 20l to the feeder section switch 22c, the ground coil element 26c, or to the feeder section switch 24c, the ground coil element 28c. The control system acts such that it issues on signal 33a~36a, 38a, 39a and 33a' as the transport means 4 moves in the arrow direction and its head passes the position detectors 33~36, 38, 39 and 33' and by these signals it turns on the feeder section switch corresponding to the ground coil element just ahead while at the same time by off signals 33b – 36b, 38b, 39b and 33b' it turns off the feeder section switch corresponding to the ground coil element just behind; this action is the same as illustrates in FIG. 8(a).

Figure 10:
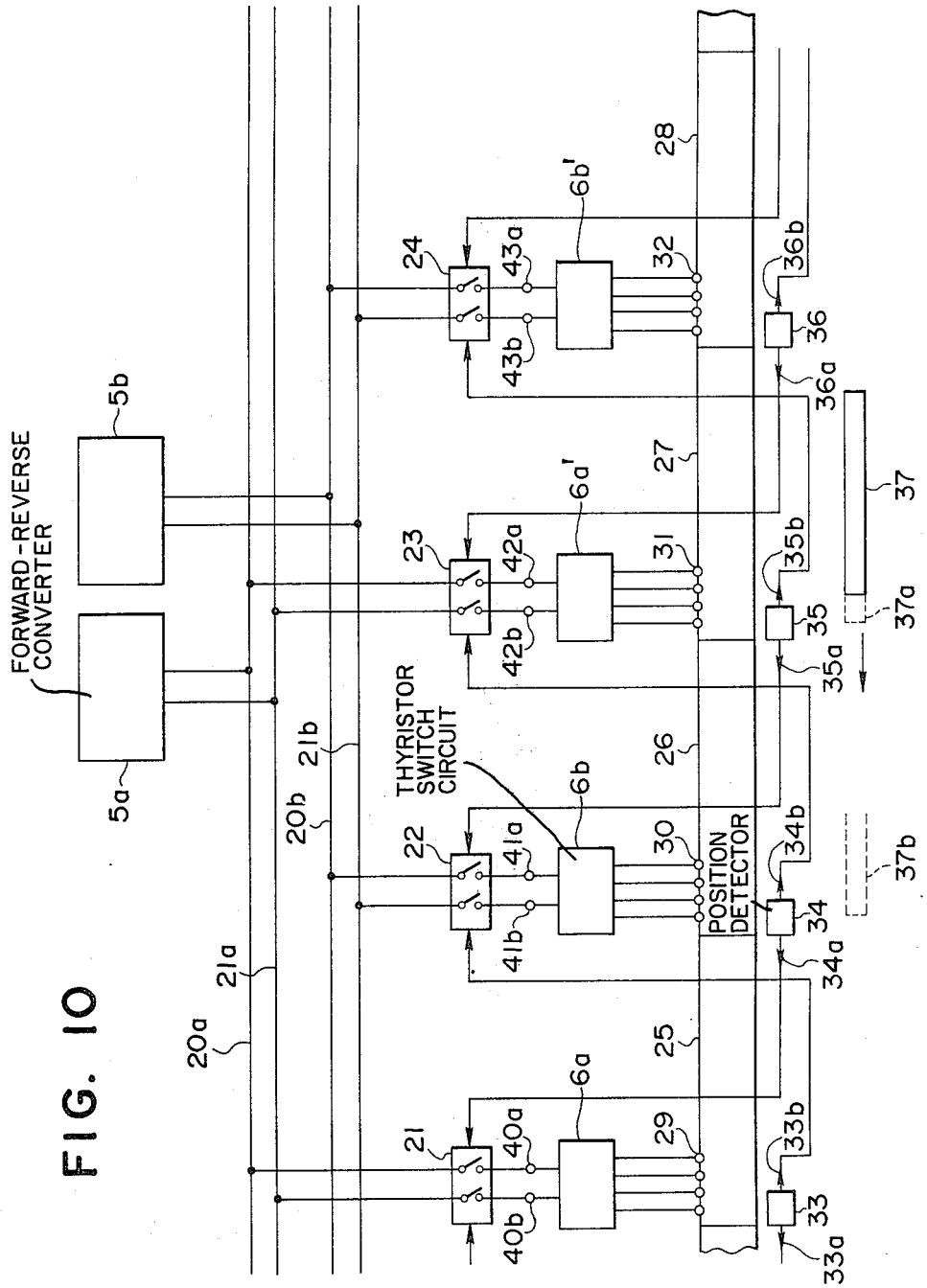
FIG. 10 is a circuit diagram illustrating third embodiment of FIG. 8.

FIG. 10 shows a third example of the present invention. What is shown in FIG. 10, as compared with the one shown in FIG. 8, is characterized in that the output side of the dc constant current forward-reverse converter 5a is directly connected to the feeders 20a and 21a of the (a) part, while the output side of the dc constant current forward-reverse converter 5b is connected directly to the feeders 20b and 21b of the (b) part. The difference lies in that the two feeders 20a and 21a of the (a) part and the two feeders 20b and 21b of the (b) part, i.e. four feeders in total are provided along all the ground coils; and the thyristor switch circuits 6a – 6b' are respectively connected via the ground coil terminals 29 – 32 to the ground coil elements 25 ~ 28. The thyristor switch circuits 6a and 6a' are respectively connected via the feeder section switches 21 and 23 to the corresponding points of the feeders 20a and 21a in the (a) part; and the thyristor switch circuits 6b and 6b' are respectively connected via the feeder section switches 22 and 24 to the corresponding points of the feeders 20b and 21b in the (b) part. Otherwise FIG. 10 is absolutely the same as that in FIG. 8(a). In FIG. 8 and 9, identical symbols represents identical elements. In FIG. 10, the direct current flows from the dc constant current forward-reverse converter 5a and 5b via the feeders 20a ~ 21b, but the ac output from the thyristor switch circuits 6a ~ 6b' is directly supplied to the ground coil elements. Therefore, even when the ground coils are to be controlled over a considerable length of the feeders 20a ~ 21b, the switching of the thyristor switch circuits can easily be made.

Figure 11:
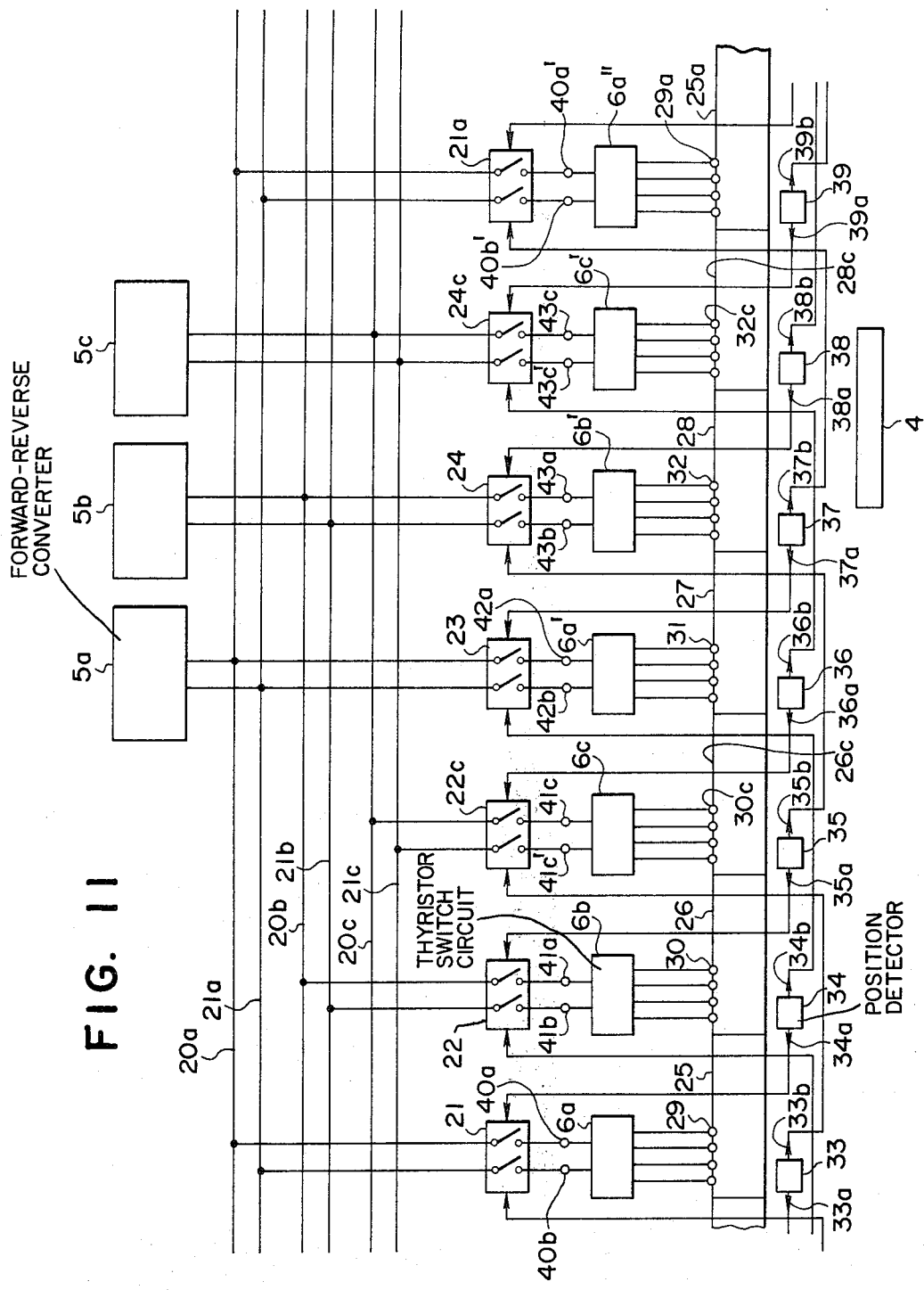
FIG. 11 is a circuit diagram illustrating a fourth embodiment of the present invention.

FIG. 11 illustrates a fourth example of the present invention, which is a drive power supply control system for a thyristorized linear motor using three sets of dc constant current forward-reverse converters based on the same idea as illustrated in FIG. 10. What is shown in FIG. 11, as compared with the one in FIG. 10, is characterized in that the drive power supply system from the dc constant current forward-reverse converters to the ground coil elements is constituted of the following three parts; the (a) part which leads via the dc constant current forward-reverse converter 5a and the feeder 20a and 21a to the feeder section switch circuit 21, the thyristor switch 6a, the ground coil element 25, or to the feeder section switch circuit 23, the thyristor switch 6a', the ground coil element 27, or to the feeder section switch circuit 21a, the thyristor switch 6a'', the ground coil 25a; the (b) part which leads via the dc constant current forward-reverse converter 5b, and the feeder 20b and 21b to the feeder section switch 22, the thyristor switch circuit 6b, the ground coil element 26 or to the feeder section switch 24, the thyristor switch 6b' the ground coil element 28; and the (c) part which leads via the dc constant current forward-reverse converter 5c and the feeder 20c and 21c to the feeder section switch circuit 22c, the thyristor switch 6c, the ground coil element 26c or to the feeder section switch 24c, the thyristor switch 6c' the ground coil element 28c. The rest of the system is the same as in FIG. 10. In FIG. 10 and 11 identical elements are represented by identical symbols. The principle is the same as in FIG. 10, namely, with progress of the transport means 4, the power is supplied always to three sections of ground coil elements.

Figure 12:
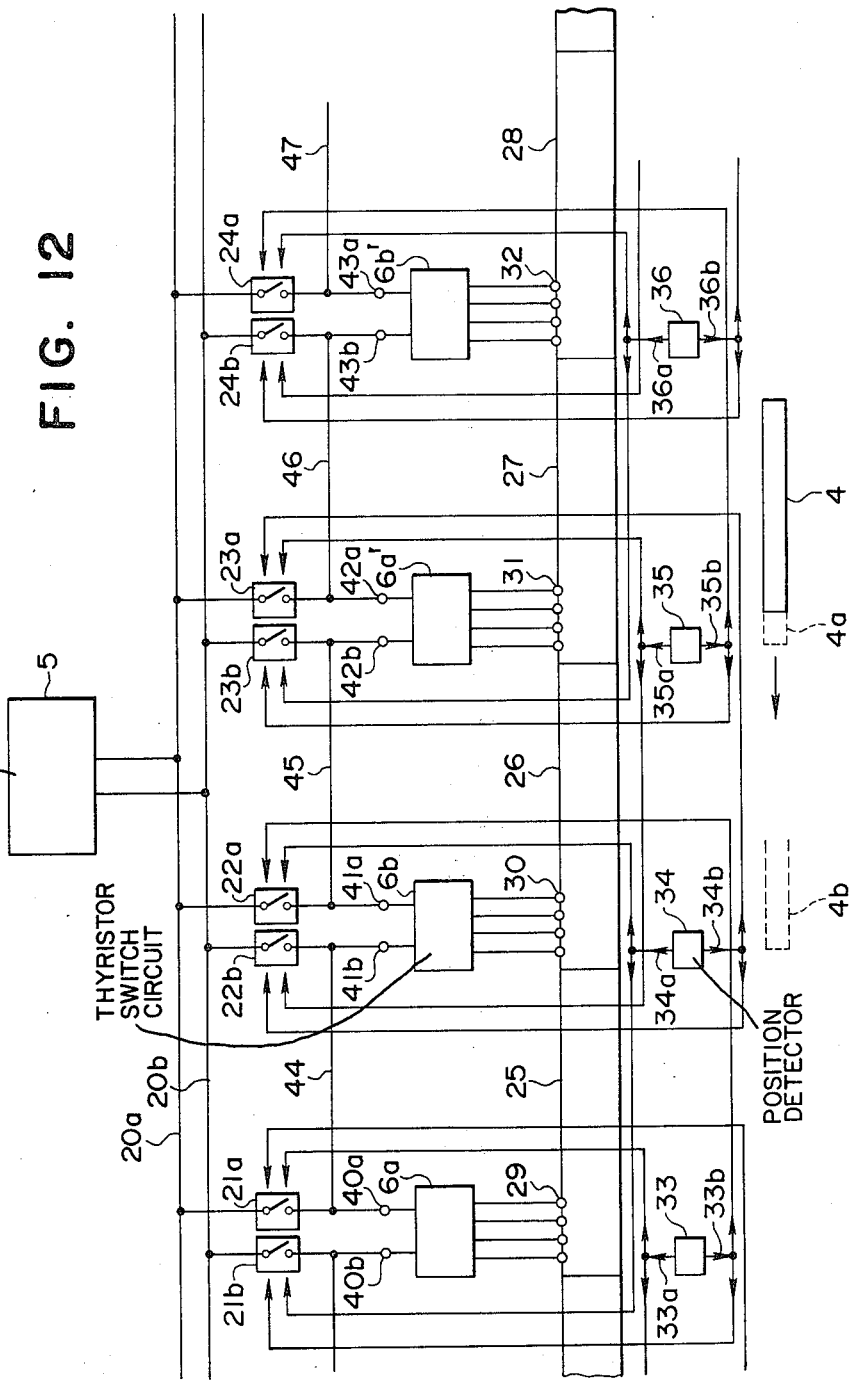
FIG. 12 is a circuit diagram illustrating a fifth embodiment of the present invention.

FIG. 12 illustrates a fifth example of the present invention, wherein the drive power is supplied by series-connecting two of the ground coil elements which are related to the transport means.

In FIG. 12, 5 is the dc constant current forward-reverse converter; 20a is a feeder on the positive side; 20b is a feeder in the negative side; 21a – 24a are feeder section switches on the positive side; 21b–24b are feeder section switches on the negative side; 44–47 are transitions; 40a – 43a are input terminals in the positive side; 40b – 43b are input terminals in negative side; 6a – 6b' are thyristor switch circuits; 29 – 32 are ground coil terminal; 25 – 28 are ground coil elements; 33 – 36 are position detectors; 33a – 36a are on signals and 33b – 36b are off signals.

Among the above, the ground coil element 25 – 28, the dc constant current forward-reverse converter 5, the feeders 20a and 20b, the thyristor switch circuits 6a – 6b', the position detectors 33 – 36, the on signals 33a – 36a and the off signals 33b – 36b are of the same constitution as the corresponding ones in FIGS. 8 – 11.

In FIG. 12, there is only one dc constant current forward-reverse converter; the positive input terminals 40a – 43a of the thyristor switch circuits 6a – 6b' are respectively connected via the positive section switches 21a – 24a to the positive feeder 20a; and the negative input terminals 40b – 43b are respectively connected via the negative feeder section switches 21b – 24b to the negative feeder 20b. Meanwhile, connections are made in succession using transitions. The input of thyristor switch circuits load and the positive input terminal of a thyristor switch circuits just ahead in the moving direction are connected by a transition; for instance, the positive input terminal 40a and the negative input terminal 41b by the transition 44, the positive input terminal 41a and the negative input terminal 42b by the transition 45, the positive input terminal 42a and the negative input terminal 43b by the transition 46, the positive input terminal 43a and the negative input terminal of a thyristor switch circuit just behind in the moving direction by the transition 47. The position detector 33 – 36, detecting the progress of the transport means 4 in the arrow direction by media such as light, sound wave or radio wave, issue on signals 33a – 36a, thereby turning on the positive feeder section switches 21a – 24a, corresponding to the coil elements at that position and the negative feeder section switches 21b – 24b corresponding to the ground coil element just ahead. For example, the ON-instruction 33a turns on the positive feeder section switch 21a and, though not shown, the negative feeder section switch just ahead in the moving direction. The on signal 34a turns on the positive feeder section switch 22a and the negative feeder section switch 21b. The on signal 35a turns on the positive feeder section switch 35a turns on the positive feeder section switch 23a and the negative feeder section switch 22b. The on signal 36a turns on the positive feeder section switch 24a and the negative feeder section switch 23b. Meanwhile the off signals 33b – 36b are issued, thereby turning off the negative feeder section switch corresponding to the ground coil element at that position and the positive feeder section switch corresponding to the ground coil element just behind. For example, the off signal 33b turns off the negative feeder section switch 21b and the positive feeder section switch 22a. The off signal 34b turns off the negative feeder section switch 22b and the positive feeder section switch 23a. The off signal 35b turns off the negative feeder section switch 23b and the positive feeder section switch 24a. The off signal 36b turns off the negative feeder section switch 24b and, though not shown, the positive feeder section switch just behind. Suppose the transport means 4 comes from the right side and reaches the indicated position. In this state, the on and off signals from the positive detector 36 and, though not shown, a position detector just behind it set the positive feeder section switch 24a, and the negative feeder section switch 23b in an on condition; the drive power is supplied to the ground coil element 28 from the dc constant current forward-reverse converter 5 through the circuit of the positive feeder 20a, the positive feeder section switch 24a, the positive input terminal 43a, the thyristor switch circuit 6b', the ground coil terminal 32 and the negative input terminal 43b; and the drive power is supplied to the ground coil element 27 through the circuit of the input terminal 43b, the transition 46, the input terminal 42a, the thyristor switch circuit 6a', the ground coil terminal 31, the negative input terminal 42b, the negative feeder section switch 23b and the negative feeder 20b. Ultimately, the ground coil elements 27 and 28 are connected in a series circuit via the thyristor switch circuit 6a' and 6b' and thus they receive the drive power from the dc constant current forward-reverse convertor 5.

When the transport means reaches the position 4a the position detector 35 gives the on signal 35a, by which the positive feeder section switch 23a, corresponding to the ground coil element 27 at that position, and the negative feeder section switch 22b, corresponding to the ground coil element 26 just ahead, are turned ON. At the same time the off signal 35b given by the same detector turns off the negative feeder section switch 23b corresponding to the ground coil element 27 and the positive feeder section switch 24a corresponding to the ground coil element 28 just behind. Thus ultimately the drive power supply which has been made to the ground coil elements 27 and 28 from the dc constant current forward-reverse converter 5 via the positive feeder 20a, the positive feeder section switch 24a, the positive input terminal 43a, the thyristor switch circuit 6b', the negative input terminal 43b, the transition 46, the positive terminal 42a and the negative feeder section switch 23b is supplied the ground coil element 26 and 27 via the positive feeder 20a, the positive feeder section switch 23a, the positive input terminal 41a, the thyristor switch circuit 6b, the negative input terminal 22b, the negative feeder section switch 22b, and the negative feeder 20b. Similarly, when the transport means 4 comes up to the position 4b, the position detector 34 gives the on signal, which turns on the positive feeder section switch 22a corresponding to the ground coil element 26 at that position and the negative feeder section switch 21b corresponding to the ground coil element 25 just ahead, while at the same time its off signal 34b turns off the negative feeder section switch corresponding to the ground coil element 26 at that position and the positive feeder section switch 23a corresponding to the ground coil element 27 just behind. Ultimately the dc constant current forward-reverse converter 5 supplies the drive power to the ground coil elements 25 and 26 which are connected in series.

In the example illustrated in FIG. 12, with progress of the transport means 4 the drive power is supplied from the dc constant current forward-reverse converter 5 and two sets of thyristor switch circuits all the time to two sections of ground coil elements connected in series. Thus, this example is preferable in that the whole system can function without being influenced by the size of transport means or the transport means being in transition between ground coil elements.

Figure 13:
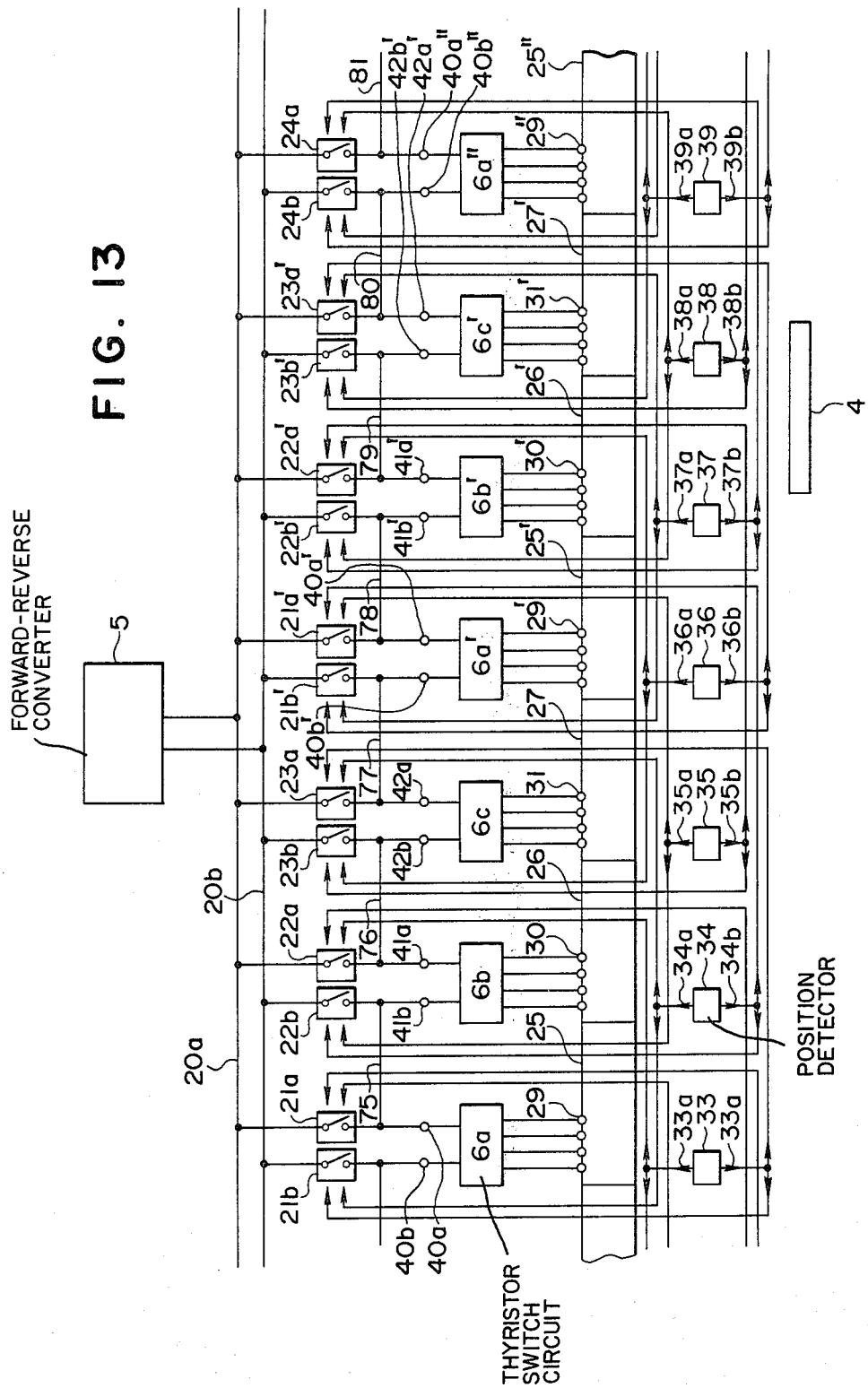
FIG. 13 is a circuit diagram illustrating a sixth embodiment of the present invention.

FIG. 13 illustrates an example based on the same idea as FIG. 12, wherein three of the ground coil elements particularly related to the transport means are series-connected to receive the drive-power. In FIG. 13, 5 is the dc constant current forward-reverse convertor; 20a is a positive feeder; 20b is a negative feeder; 21a – 23a, 21a' – 23a' and 24a are positive feeder section switches; 21b–23b, 21b' – 23b', and 24b' are negative feeder section switches; 75–81 are transitions; 40a – 42a, 40a' – 42a' and 40a'' are positive input terminals; 40b – 42b, 40b' – 42b and 40b'' are negative input terminals; 6a – 6c, 6a' – 6c' and 6a'' are thyristor switch circuit; 25–27, 25' – 27' and 25'' are ground coils; 29 – 31, 29' – 31', and 29'' are ground coil terminals; 33 – 39 are position detectors; 33a – 39a are on signals; 33b – 39b are off signals; and 4 is the transport means. These are all of the same type as the corresponding ones in FIG. 12, with the only difference being that in the control system of FIG. 13 the on signal from the position detectors 33 – 36 turn on the negative feeder section switch corresponding to the ground coil element just ahead in the moving direction and the positive feeder section switch corresponding to the ground coil element just behind in the moving direction. And the off signals 33b – 39b turn off the positive feeder section switches respectively corresponding to their position. Otherwise the principle is the same as in FIG. 11; namely, with progress of the transport means always three sections of ground coil elements receive the power.

As apparent from the above mentioned examples, the present invention makes it possible to realize a drive power supply control system best suited for speed up and automation of vehicle operation, using a drive power supply control system for a thyristorized linear motor. The drive power is supplied from a dc constant current forward-reverse convertor to only those of the ground coils which are related to the transport means, thereby reducing the power loss in the ground coils, increasing the efficiency, reducing the inductance in the ground coils connected to thyristor switch circuits; and thereby facilitating the circuit switch action of the switches and preventing the transport means, which pass over the electrical sectioning points of ground coil elements, from influencing the current flowing in the ground coils.

What is claimed is:

1. A transport means drive power supply control system wherein said transport means includes field coils said system comprising:
    a. at least one dc constant current forward-reverse converter;
    b. a first plurality of thyristor switch circuits corresponding to said dc constant current forward-reverse converters;
    c. feeder means coupled to the output of said thyristor switch circuits;
    d. a second plurality ground coil means, said ground coil means being geometrically integral but electrically sectioned wherein said first plurality is less than said second plurality;
    e. position detector means located in proximity to said ground coil means for detecting the position of said transport means; and
    f. feeder section switch means, coupled between said feeder means and said ground coil means, and controlled by said position detector means for controlling the energization of said ground coil means in a predetermined relationship to the position of said transport means whereby the magnetic fields of said ground coil means interacts with said field coils to provide a driving force to said transport means.

2. The system of claim 1 wherein a position detector means corresponds to each ground coil means and is coupled to the feeder section switch means corresponding to the ground coil means prior to and succeeding the ground coil means corresponding to said position detector means.

3. The system of claim 1 wherein a position detector means corresponds to each ground coil means and is coupled to the feeder section switch means of the succeeding ground coil means and to the second preceeding ground coil means.

4. A transport means drive power supply control system wherein said transport means includes field coils said system comprising:
    a. ground coil means, electrically sectioned but geometrically integral;
    b. at least one dc constant current forward-reverse converter;
    c. feeder means coupled to said dc constant current forward-reverse converter;
    d. feeder section switch means coupled to said feeder means;
    e. thyristor switch circuit means coupled to said feeder section switch means and coupled to said ground coil means, wherein said feeder section switch means control the current through said thyristor switch circuit means; and
    f. position detector means located in proximity to the ground coil means and coupled to said feeder section switch means for controlling said feeder section switch means in accordance with the position of said transport means, whereby said ground coils are energized in a predetermined relationship to the position of said transport means such that the magnetic field of said ground coil means interacts with said field coil to provide a driving force to said transport means.

5. The system of claim 4 wherein said feeder section switch means includes a positive switch means and a negative switch means.

6. The system of claim 5 wherein said position detector means correspond to said ground coil means and are coupled to said negative switch means corresponding to the succeeding ground coil means and to the positive switch means corresponding to the corresponding ground coil means.

7. The system of claim 5 wherein said position detector means correspond to said ground coil means and are connected to the negative switch means corresponding to the succeeding ground coil means and to the positive switch means corresponding to the second preceeding ground coil means.

8. The system of claim 5 wherein said position detector means correspond to said ground coil means and produce an on signal coupled to the negative switch means of the succeeding coil means and the positive switch means of the corresponding ground coil means and an off signal coupled to the positive switch means of the preceeding ground coil means and the negative switch means of the corresponding ground coil means and wherein the output of each negative switch means is coupled to the output of a succeeding positive switch means.

9. The system of claim 5 wherein said position detector means correspond to said ground coil means and produce an on signal coupled to a succeeding negative switch means and a preceeding positive switch means and an off signal coupled to the corresponding negative switch means and the second preceeding positive switch means and where the output of each negative switch means is coupled to the output of the succeeding positive switch means.

* * * * *